Patented Feb. 12, 1935

1,990,505

UNITED STATES PATENT OFFICE 1,990,505

METHOD OF MAKING AN INVERTASE PREPARATION

Leo Wallerstein, New York, N. Y., assignor to Wallerstein Company, Inc., New York, N. Y., a corporation of New York No Drawing. Application August 30, 1929, Serial No. 389,616

4 Claims. (Cl. 195—20)

This invention relates to certain improvements in invertase preparations, particularly yeast invertase, and to a method or process of producing such preparations.

Products containing the enzyme invertase are used in certain industries for inverting cane sugar and have gone largely into use in the production of certain confections, as, for instance, the soft or cream centers of which certain kinds of candy are made. The use of yeast for the production of soft centers for confectionery purposes has been suggested. The use of yeast, however, as heretofore suggested is unsatisfactory commercially, in that the yeast itself is very variable or varies to considerable extent in its enzyme content, some yeast having a much larger inverting power than other yeast, so that the amount of yeast necessary for use is difficult to determine. Furthermore, such an invertase containing yeast as heretofore produced is difficult to store because of the fact that it is unstable and easily decomposed. The use of such yeast as a source of invertase therefore requires that the consumer must go through a series of elaborate tests for each particular batch of yeast to determine its enzymatic activity and the quantity that must be used, and standardization of such yeast preparation is practically impossible.

A standardized invertase solution has been proposed, but such standardized preparations, however, are produced by autolyzing yeast and standardizing the product, the autolyzed liquid product being preserved with certain preservatives, such as toluol. This method, while an improvement on the prior suggestions above referred to, is open to serious commercial disadvantages, in that the autolyzed liquid has a disagreeable and strong meaty taste and is very readily decomposed. Further, careful precautions must be taken that the toluol does not evaporate, for if it does the preparation readily decomposes and may become unfit for any use.

It is the especial object of the present invention to improve on these known methods of preparing an invertase preparation from yeast in which the product, if kept dry and not exposed to excessive humidity or dampness, does not decompose, is odorless, and in which the use of preservatives, such as toluol, is unnecessary, so that a standard preparation is produced which can be used by the consumer without the necessity for tests, and which can be made and marketed in a convenient form, and which is stable.

It is a further object of the invention to produce an improved process or method for obtaining a dry invertase preparation directly from yeast having the above set forth desirable characteristics.

I have discovered that such an invertase preparation can be produced directly from yeast by treating yeast, such as brewer's or baker's yeast containing invertase, with certain volatile water soluble reagents, which if used under proper precaution, as described below, will so act on the yeast that the enzyme intertase is retained in the yeast cell without any substantial loss in its activity, but with the yeast cell and the enzyme in such a state of suspension that it can be readily separated or recovered from the solution and dried without difficulty, the reagents employed acting on the yeast so that this can be done. Various such reagents may be employed and the yeast may be treated with these agents in various ways. One practical method and a method which has produced high yields in practice we will now describe: To one part of yeast, either in paste or compressed form, such as brewer's or baker's yeast, we add two parts of the reagent or agents by volume, and the resulting mass is carefully mixed, at room temperature, or preferably at a lower temperature, say 60° F. The duration of the treatment of the yeast by the reagents may be varied within certain limits, but I have found that usually from fifteen to thirty minutes is sufficient for the desired action of the agents. Various volatile water soluble reagents may be used, as before stated, but I have secured good results with the use of acetone, ethyl carbinol, dimethyl carbinol, trimethyl carbinol and diacetone alcohol, and these reagents may be used alone or may be mixed.

These organic solvents all have a higher molecular weight than normal ethyl alcohol and since they are also soluble in water they may be termed "water soluble higher alcohols". These alcohols may be utilized alone, mixed together or consecutively, as desired.

After the yeast has been acted on by these reagents, it is removed from the mixture by pressing, or in a centrifuge, or other suitable method, and the resulting invertase containing product can then be dried. Care must be taken in drying that the invertase is not destroyed, the drying being effected at a low temperature, preferably not exceeding 100° F. This product is a yellowish or grayish powder which contains a large part of the active invertase of the yeast. This product is very stable, practically odorless and is without objectionable taste, and of very high activity, and can be kept for long periods without change and without the use of antiseptics provided it is kept in a dry state and is not exposed to excessive humidity.

After the pressing or other treatment, the solvent can be recovered for further use, and any substances dissolved from the yeast by the reagent may be recovered and used for food or other purposes.

The enzymatic strength of this product can be readily ascertained, and the product when sold to the consumer can be diluted and standardized with some harmless substances, such as cane sugar, milk sugar, dextrose, starch or similar substances. Thus the consumer has a product on which he can rely as to activity, and this product is particularly adapted for the confectionery trade in making soft centered candy, though, of course, it may be used for other purposes.

The paste or compressed yeast used as above stated, as sold upon the market contains more than 50% of water and usually more than 65% and normally contains about 80% of water.

The treatments above described including the treatment with the ethyl carbinol, dimethyl carbinol, trimethyl carbinol and diacetone alcohol will advantageously devitalize the yeast and at the same time destroy or inactivate the zymase present in the yeast without at all disadvantageously affecting the invertase.

What I claim is:

1. The process of preparing a dry invertase preparation which comprises acting directly on yeast containing invertase with a treating agent consisting of one of the water soluble saturated aliphatic alcohols of higher molecular weight than ethyl alcohol below a temperature sufficiently high to destroy the invertase and in a concentration which will substantially devitalize the yeast, and recovering the resulting devitalized yeast from the solution.

2. The process of producing a dry invertase preparation which comprises acting directly on yeast containing invertase with a water soluble saturated aliphatic alcohol, of higher molecular weight than ethyl alcohol below a temperature sufficiently high to destroy the invertase and in a concentration which will substantially devitalize the yeast, recovering the resulting devitalized yeast and drying the product under conditions which will not destroy the enzyme.

3. The process of producing a dry invertase preparation which comprises treating yeast with dimethyl carbinol below a temperature sufficiently high to destroy the invertase and in a concentration which will substantially devitalize the yeast, recovering the resulting devitalized yeast from the solution and drying the product under conditions which will not destroy the invertase.

4. The process of producing a dry invertase preparation, which comprises directly treating yeast with a mixture of dimethyl carbinol and acetone below a temperature sufficiently high to destroy the invertase and in a concentration which will substantially devitalize the yeast.

LEO WALLERSTEIN.